United States Patent [19]

Hong

[11] 4,225,969

[45] Sep. 30, 1980

[54] METHOD AND APPARATUS FOR TESTING A FREQUENCY SYNTHESIZER IN AN RF MODEM

[75] Inventor: Ju H. J. Hong, Raleigh, S.C.

[73] Assignee: International Business Machines Corporation, Armonk, N.Y.

[21] Appl. No.: 8,008

[22] Filed: Jan. 31, 1979

[51] Int. Cl.³ .............................................. H04B 17/00
[52] U.S. Cl. ........................................ 455/67; 455/86; 455/226
[58] Field of Search ................. 325/67, 133, 134, 363, 325/20; 364/484

[56] References Cited

U.S. PATENT DOCUMENTS

| | | | |
|---|---|---|---|
| 3,736,510 | 5/1973 | Wu | 325/134 |
| 3,983,484 | 9/1976 | Hodama | 325/20 |
| 4,031,469 | 6/1977 | Johnson | 325/67 X |
| 4,048,564 | 9/1977 | Gleeson, Jr. | 325/67 |

*Primary Examiner*—Jin F. Ng
*Attorney, Agent, or Firm*—Gerald R. Woods

[57] ABSTRACT

A multiple frequency RF modem includes a frequency synthesizer for providing local oscillator signals to double balanced mixer circuits in both the transmitter and receiver sections. To test the frequency synthesizer, the synthesizer is set to produce a local oscillator signal having a nominal frequency of 3 IF. The transmitter RF filter is tuned to suppress all harmonics and sidebands other than the 4 IF sideband. A ganged set of switches is employed to connect the transmitter output directly to the receiver input in the modem. Another switch in the set isolates the receiver mixer circuit from the frequency synthesizer during testing and connects it instead directly to the output of an IF oscillator in the transmitter section. Due to its non-linear operating characteristics, the receiver mixer circuit generates a strong third harmonic of its local oscillator input. During operation in the testing mode, this third harmonic has a frequency of 3 IF. The mixer circuit combines the 3 IF harmonic with the nominal 4 IF signal received through the wrap line. If the received signal has an actual frequency of 4 IF, a strong signal will appear at the output of the IF filter in the receiver. Since the wrapped signal has an actual frequency of 4 IF only if the frequency synthesizer output during testing is actually 3 IF, a strong output signal indicates that the frequency synthesizer is operating properly.

4 Claims, 1 Drawing Figure

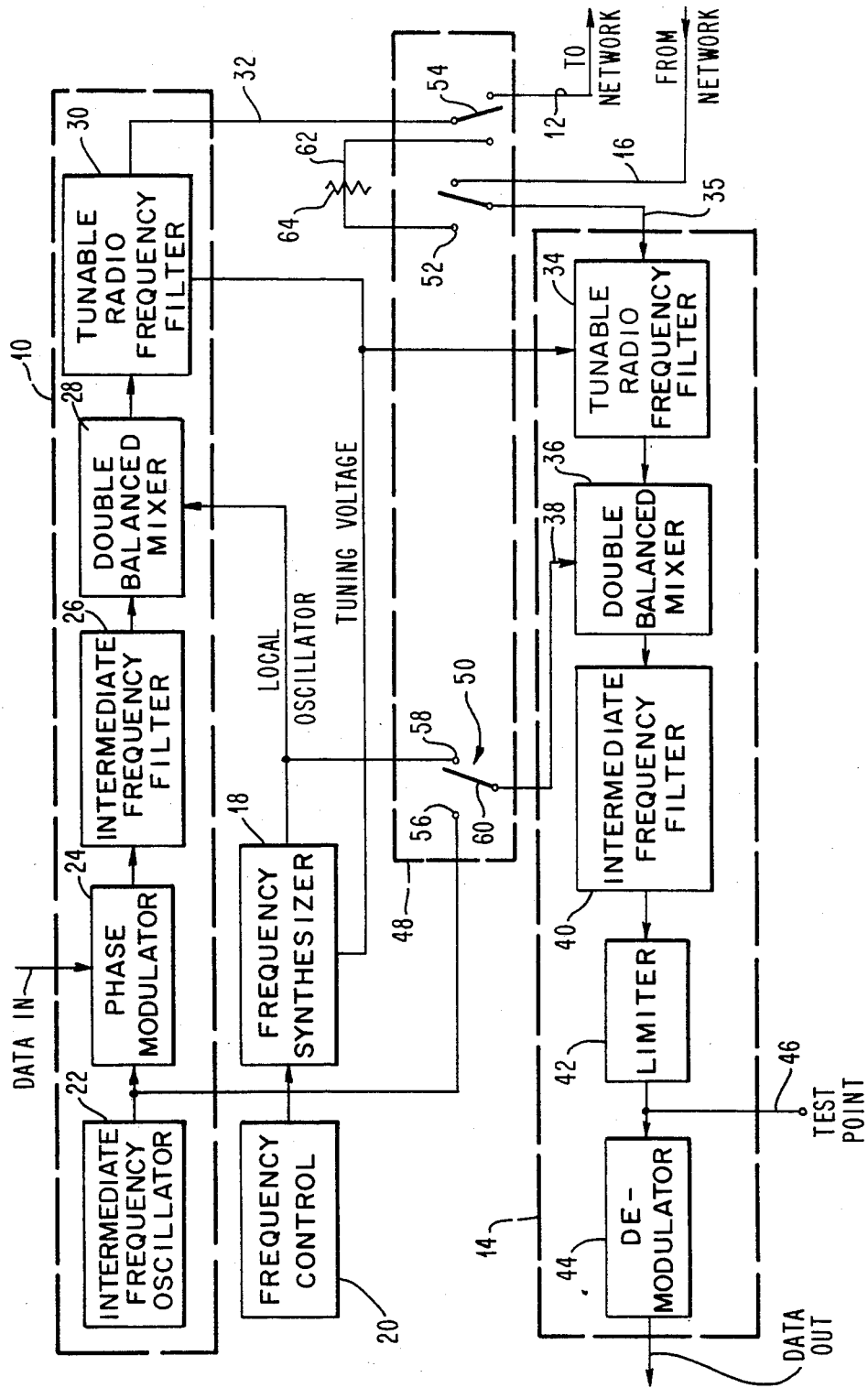

METHOD AND APPARATUS FOR TESTING A FREQUENCY SYNTHESIZER IN AN RF MODEM

TECHNICAL FIELD

The present invention relates to modems and more particularly to a method and apparatus for testing a frequency synthesizer in an RF modem.

PRIOR ART

In the field of data processing, there is a trend toward proliferation of remote terminals and other input-output devices which allow more users to have access to the data processing system. While this proliferation has been a source of substantial benefits to many computer users, it does not occur without giving rise to problems.

A common approach to installing remote terminals requires that a cable be provided between a remote terminal and each processor or control unit to which the terminal is to have access. In large installations, different processors may be loaded with independent programs to allow a user to gain immediate access to a number of major programs. In some of these installations, a cable is run from each processor to a manually controlled switch located at each remote terminal. An operator sets the switch to select the particular processor which is to be accessed. This approach has significant drawbacks. Since each processor which is to be accessed by a remote terminal is permanently connected to the switch at that terminal, one of the input/output ports at the processor is completely dedicated to that terminal even when the terminal is not in use or is being used to access another processor. More specifically, if a single remote terminal is to be capable of accessing n processors, then n cables and n dedicated I/O processor ports must be made available to that terminal. However, since only one cable and only one port can be used at a given time, n−1 cables and n−1 ports will necessarily be idle. Clearly, it is desirable to avoid the hardware costs and system inefficiencies associated with the idle cables and idle input/output ports.

While the redundant cables can be eliminated by moving the processor-selecting switch to a point closer to the processors, it is still necessary to provide at least one cable per remote terminal and a number of dedicated I/O ports. This is not an extremely efficient use of system resources, since even that single cable will normally be idle much of the time.

Moreover, business operations are not static. People are moved as product lines change and business demands vary. The need to have at least one cable dedicated to each remote terminal makes it difficult to adapt a data processing network to changes in business operations. Each time a computer user moves his terminal, the old cable must be rerouted or replaced by a new cable running from the processor to the new terminal location. Rearranging a cable network is costly in terms of materials and labor and in terms of system efficiency.

Serious consideration has been given to the use of radio frequency or RF modems for intra-plant data communications between remote terminals and central processors. One advantage of such modems is that considerable effort has already been expended for development of RF cables and connectors in connection with voice and video communication. Since the RF cable/-connector technology is relatively mature and stable, it can be effectively utilized by manufacturers of data processing equipment with relatively little research and development cost and with relatively few unknown problems. Another reason why RF technology appears to be attractive for intra-plant data communications is that it increases the flexibility of the network. RF cables can be installed within a plant during construction and later tapped into at relatively low cost to provide a common bus to remote processors.

Frequency synthesizers have been developed which permit modems to operate at different output frequencies rather than a single fixed frequency. Thus, it is possible for remote terminals to share an RF cable on a frequency division basis. That is, a remote terminal operating at a given frequency can send and receive data over a single RF cable concurrently with other terminals operating at other frequencies. At a given frequency, a plurality of terminals might time share the cable. To use arbitrarily selected numbers, if it is assumed that a modem can transmit or receive data at ten different RF frequencies and that a central processor is able to service six different terminals at a given frequency on a time-share basis, then up to sixty terminals can share a single RF cable instead of having one or more cables per terminal.

While frequency synthesizers have definite advantages favoring their use, such synthesizers have to be tested to be sure that they are generating the requested frequency. If the actual output of a frequency synthesizer does not match its nominal output, the signal produced by the modem can interfere with signals being carried on adjacent channels.

Commercially available frequency meters are capable of testing the output of a frequency synthesizer. However, such meters are far too costly to be included as part of the equipment normally carried by a customer engineer. Requiring that the modem be tested at a central service location is not a good solution. It requires that the modem be taken out of service and necessitates at least one extra trip from the service location to the customer's location.

SUMMARY

The present invention is an inexpensive means for on-site testing of a frequency synthesizer used in a radio frequency modem having a transmitter section for modulating an IF carrier in accordance with applied data and for translating the modulated IF signal to an RF signal as a function of a local oscillator signal generated by the frequency synthesizer. The radio frequency modem also includes a receiver section having an IF filter and a double balanced mixer circuit for mixing a received RF signal and a local oscillator signal normally provided by the frequency synthesizer. The test circuitry includes means for causing the frequency synthesizer to produce a local oscillator signal having a nominal frequency of 3 IF. A wrap line is included for selectively connecting the output of the transmitter section to the input of the receiver section, thus isolating the modem from the network of which it is normally a part. Means are also included for selectively isolating the mixer circuit in the receiver from the local oscillator output of the frequency synthesizer and for driving the mixer circuit with the IF carrier signal produced by an IF oscillator in the transmitter section. Due to its nonlinear characteristics, the mixer generates a strong harmonic at three times the local oscillator input which, in the test mode, is equal to 3 IF. When this harmonic is mixed with the applied RF signal, a signal having an IF component is produced, provided the actual output of the frequency synthesizer is equal to 3 IF.

BRIEF DESCRIPTION OF THE DRAWING

While the specification concludes with claims particularly pointing out and distinctly claiming that which is regarded as the present invention, further details of a preferred embodiment of the invention may be more readily ascertained from the following detailed description when read in conjunction with the accompanying block diagram of a radio frequency modem including the present invention.

Referring to the drawing, a radio frequency modem including the present invention is shown primarily in block diagram form since the functional components of the modem are conventional in nature.

The modem includes a transmitter section 10 which operates on applied data to produce a phase modulated radio frequency (RF) signal which can be applied to an RF network through a modem output line 12. The modem also includes a receiver section 14 for receiving modulated RF signals from the network at an input line 16 and for operating on these signals to extract encoded data. A frequency synthesizer 18 provides local oscillator inputs to transmitter section 10 and to receiver section 14. The frequency synthesizer circuit can produce constant amplitude signals at different predetermined frequencies. Such a synthesizer normally includes a phase locked loop with a voltage controlled oscillator for establishing the frequency to be maintained by the loop. The controlling voltage for the voltage controlled oscillator is provided by a frequency control circuit 20, the output of which is a set of binary logic signals which control counters in the phase locked loop.

The transmitter section 10 includes an intermediate frequency oscillator 22, preferably crystalcontrolled, for producing an intermediate frequency (IF) carrier signal at a predetermined fixed frequency. The IF carrier is supplied to a phase modulator circuit 24 which produces a phasemodulated signal having an IF fundamental component. The output of phase modulator circuit 24 is passed through an intermediate frequency filter circuit 26 which suppresses any harmonics or noise voltages occurring outside a limited frequency band centered on the intermediate frequency.

The filtered and modulated IF signal produced by filter 26 is applied to an RF input of a double balanced mixer circuit 28. A local oscillator signal (LO) produced by frequency synthesizer 18 is also applied to mixer circuit 28. The mixer circuit 28 combines the IF and LO inputs and generates modulated output signals having strong frequency components at IF±LO and other higher order sidebands and harmonics of the LO and IF signals. The upper and lower sideband signals have the same information content. To reduce transmission power requirements, a tunable radio frequency filter 30 suppresses all signals other than the upper sideband signal at a frequency of IF+LO. The upper sideband signal passes through filter 30 to the output line 32 of the transmitter section. The control voltage for filter 30 is provided by frequency synthesizer 18 and is determined by the frequency of the local oscillator output produced by synthesizer 18.

The receiver section of the modem also includes a tunable radio frequency filter 34. Filter 34 passes only those signals received on an input line 35 that fall within a predetermined frequency band centered on the tuned radio frequency. The RF signal passed by filter 34 is applied to a double balanced mixer circuit 36 where it is mixed with a local oscillator signal provided at input 38. The mixer circuit 36 generates signals at the sum and difference of the two inputs. More specifically, where the received RF signal has a frequency of IF+LO and the local oscillator input to the mixer circuit 36 has a frequency LO, the signals produced by the mixer circuit will include frequency component at IF, and IF+2 LO. The generated signals are applied to an intermediate frequency filter 40 which suppresses signals outside of a frequency band centered on IF. The passed IF signal is clipped in limiter circuit 42 before the modulated IF signal is passed to a demodulator circuit 44. Demodulator circuit 44 extracts the data originally used to modulate the signal. The receiver section includes a test point 46 at the output of limiter circuit 42.

To enable the accuracy of the frequency synthesizer to be checked easily and without the use of external test equipment, a testing circuit is incorporated into the modem. This circuit includes a ganged switch 48 which consists of three single pole double throw switches 50, 52, and 54. The first fixed contact 56 of switch 50 is connected directly to the output of the intermediate frequency oscillator 22 in the transmitter section 10 while the second fixed contact 58 is connected to the local oscillator output of the frequency synthesizer 18. The movable contact 60 of switch 50 is connected to the local oscillator input 38 of the double balanced mixer circuit 36 in receiver section 14.

The switches 52 and 54 are part of a wrap circuit which includes a wrap line 62 having a series attenuator or pad 64. The movable contact of switch 54 connects the transmitter output line 32 either to the network through network output line 12 or to an input of the wrap line 62. The movable contact on switch 52 connects receiver section 14 either to the network through line 16 or to the wrap line 62.

Switches 50, 52 and 54 are ganged so that they may be switched simultaneously from normal settings to test mode settings.

When the modem is operating in its normal mode, the local oscillator output of frequency synthesizer 18 is applied to the mixer circuits 28 and 36 in the transmitter and receiver sections, respectively. The output signal on line 32 from transmitter section 10 is applied to the network through network output line 12. The receiver section 14 receives RF signals from the network through line 16.

To test the accuracy of the frequency synthesizer 18, the ganged switch 48 is set to the test mode settings. In the test mode settings, the local oscillator input 38 to the mixer circuit 36 is isolated from the frequency synthesizer and is instead connected directly to the output of the intermediate frequency oscillator 22 in transmitter section 10. The output line 32 from transmitter section 10 is connected directly to the input of a wrap line 62 while the input of receiver section 14 is connected directly to the output side of wrap line 62. The control signals provided by frequency control circuit 20 are set to select the output of the frequency synthesizer at a nominal frequency of 3 IF. This 3 IF signal is applied to a local oscillator input of the mixer circuit 28 in the transmitter section 10. Assuming no data is applied to the phase modulator circuit 24 during the test, the signal applied to the double balanced mixer circuit 28 by the intermediate frequency filter 26 will be an unmodulated carrier at the IF frequency. The output of mixer circuit 28 will have nominal frequency components at 2 IF and 4 IF. Since tunable filter 30 will suppress the lower sideband a signal at a nominal 4 IF frequency should be transmitted through the wrap line 62 directly to the filter 34 in receiver 14.

The local oscillator signal applied to mixer circuit 36 in receiver 14 will have a frequency exactly equal to IF in the test mode since it is supplied directly from the output of the IF oscillator 22. When the IF and 4 IF signals are mixed, the primary signals produced by mixer circuit 36 will have frequencies of 4 IF±IF or 3 IF and 5 IF. However, because of its non-linear operating characteristics, the mixer circuit 36 will also generate slightly weaker signals having frequencies equal to the frequency of the applied signal plus or minus the third harmonic of the local oscillator input to the mixer circuit 36.

Since the applied RF signal has a nominal frequency of 4 IF and the local oscillator input in the test mode is equal to IF, the sum and difference of the term RF±3 LO can also be expressed as 4 IF±3 IF. Thus, the mixed signal will have a substantial IF component if the wrap signal has an actual frequency of 4 IF. The actual frequency of the wrap signal will be 4 IF only if the frequency synthesizer 18 is actually generating an output at the nominally selected test frequency; namely, 3 IF. The test signal can be detected at test point 46. If, however, the actual frequency synthesizer output is not equal to the nominal output, mixer circuit 36 will produce either a very weak or no signal at test point 46.

To illustrate, assume that the frequency synthesizer actually generates a signal having a frequency 2.5 IF when it has been nominally set to produce a 3 IF signal. When the 2.5 IF output is applied to mixer circuit 28 in transmitter 10, the generated signals will have frequencies equal to 2.5 IF±IF or 1.5 IF and 3.5 IF. Since the tuning voltage produced by frequency synthesizer 18 corresponds to the local oscillator output, filter 30 will pass the 3.5 IF signal through switch 54 and wrap line 62 to the input of filter 34 in receiver 14. However, when the 3.5 IF signal passed by filter 34 is mixed in circuit 36 with the local oscillator input at its IF frequency, the third harmonic produced will have frequencies equal to 3.5 IF±3 IF or 0.5 IF and 6.5 IF. Signals at either of these frequencies will be suppressed by the intermediate frequency filter 40. Consequently, there will be a weak or no signal at test point 46 at the output of limiter 42.

The foregoing description assumed that no data is applied to phase modulator circuit 24 during operation in the test mode. Consequently, all of the signals which are generated and transmitted through the transmitter or receiver sections are unmodulated in nature. To provide a more rigorous test of the modem operation, test data could be applied to phase modulator 24. Assuming the modem, including the frequency synthesizer 18, is operating properly, identical data should be extracted from the data stream by demodulator 44. While a lack of correspondence between the data applied to phase modulator 24 and the data extracted by demodulator 44 does not necessarily indicate that the frequency synthesizer is operating improperly, it does indicate that a problem exists somewhere within the modem.

While there has been described what is considered to be a preferred embodiment of the invention, variations and modifications therein will occur to those skilled in the art when they become acquainted with the basic concepts of the invention. Therefore, it is intended that the appended claims shall be construed to include not only the preferred embodiment but all such variations and modifications as fall within the true spirit and scope of the invention.

Having thus described my invention, what I claim as new, and desire to secure by Letters Patent is:

1. For use in a radio frequency modem having a frequency synthesizer, a transmitter section having an IF oscillator, means for modulating an IF carrier from said IF oscillator in accordance with applied data and means for translating the modulated IF signal to an RF signal as a function of a local oscillator signal generated by the frequency synthesizer and a receiver section including an IF filter and a double balanced mixer circuit for mixing a received RF signal and a local oscillator signal normally provided by the frequency synthesizer, means for testing the integrity of the frequency synthesizer output comprising:
   means for causing the frequency synthesizer to produce a local oscillator signal having a nominal frequency of 3 IF;
   a wrap line for selectively connecting the output of the transmitter section to the input of the receiver section for supplying the RF signal to the receiver input section;
   means for selectively isolating the mixer circuit in the receiver from the local oscillator output of the frequency synthesizer and for supplying the transmitter section IF carrier signal as a local oscillator input to the mixer circuit, said mixer circuit internally producing a strong harmonic at ±3× the local oscillator input supplied by the transmitter section IF carrier signal, which harmonic is mixed with the applied RF signal to produce a signal having an IF component when the nominal output of the frequency synthesizer is actually equal to 3 IF.

2. A testing apparatus as recited in claim 1 further including ganged switching means for, simultaneously, isolating the transmitter section from its normal network connection while connecting it to the input end of the wrap line, isolating the receiver section from its normal network connection while connecting it to the output end of the wrap line, and isolating the local oscillator input of the receiver mixer circuit from the frequency synthesizer while connecting it to an output from the IF oscillator in the transmitter section.

3. A method of testing a frequency synthesizer in a radio frequency modem having a transmitter section in which incoming data modulates a carrier provided by an IF oscillator before the modulated IF signal is translated to an RF signal as a function of a local oscillator signal generated by the frequency synthesizer and a receiver section having a double balanced mixer circuit for mixing a received RF signal with a local oscillator signal normally provided by the frequency synthesizer, said method including the steps of:
   causing said frequency synthesizer to produce a local oscillator signal having a nominal 3 IF frequency;
   driving said transmitter section to generate a modulated signal having nominal frequencies of 3 IF-±IF;
   transmitting the modulated signal having the nominal frequency of 4 IF to the input of the receiver section;
   selectively isolating the double balanced mixer circuit from the local oscillator output of the frequency synthesizer and supplying directly the output of the transmitter section intermediate frequency oscillator as a local oscillator input to the receiver double balanced mixer circuit for mixing an IF input with the 4IF signal received from the transmitted signal;

passing the mixed signal through the receiver section IF filter;

determining whether a significant signal has been passed through the IF filter, such signal indicating an RF signal having an actual frequency of 4 IF has been mixed with a third harmonic of the IF input to the double balanced mixer circuit.

4. A method as defined in claim 3 further including the step of applying the output of the transmitter section directly to the input of the receiver section through a switchable wrap line during the performance of the method.

* * * * *